(12) United States Patent
Wolf et al.

(10) Patent No.: US 10,591,898 B2
(45) Date of Patent: Mar. 17, 2020

(54) CAD-BASED DESIGN CONTROL

(71) Applicant: PTC Inc., Needham, MA (US)

(72) Inventors: David Wolf, Lakewood, CO (US);
Michael Prudhomme, Englewood, CO (US); Swapan Jha, Needham, MA (US); Jeff Milkey, Phoenix, AZ (US)

(73) Assignee: PTC, Inc, Needham, MA (US)

( * ) Notice: Subject to any disclaimer, the term of this patent is extended or adjusted under 35 U.S.C. 154(b) by 225 days.

(21) Appl. No.: 15/612,406

(22) Filed: Jun. 2, 2017

(65) Prior Publication Data

US 2017/0351244 A1    Dec. 7, 2017

Related U.S. Application Data

(60) Provisional application No. 62/344,426, filed on Jun. 2, 2016.

(51) Int. Cl.
*G05B 19/4099* (2006.01)
*G05B 19/4063* (2006.01)

(52) U.S. Cl.
CPC ..... *G05B 19/4099* (2013.01); *G05B 19/4063* (2013.01); *G05B 2219/32368* (2013.01); *G05B 2219/35082* (2013.01); *G05B 2219/35227* (2013.01); *Y02P 90/265* (2015.11); *Y02P 90/86* (2015.11)

(58) Field of Classification Search
None
See application file for complete search history.

(56) References Cited

U.S. PATENT DOCUMENTS

| 7,103,434 B2 * | 9/2006 | Chernyak | G06F 17/50 700/103 |
| 2003/0149944 A1 * | 8/2003 | Reasoner | G05B 19/4097 703/1 |
| 2015/0347366 A1 * | 12/2015 | Irwin | G06F 17/241 715/231 |

OTHER PUBLICATIONS

Huang et al. "An effective subpart retrieval approach of 3D CAD models for manufacturing process reuse", Computers in Industry 67, pp. 38-53. (Year: 2015).*

* cited by examiner

*Primary Examiner* — Suzanne Lo (57) ABSTRACT

Exemplary embodiments relate to methods, mediums, and systems for associating information, including critical-to-quality (CTQ) information such as minimum or maximum part dimensions, with parts in a three-dimensional model of a product. The information may be identified by performing a failure mode effect analysis (FMEA) against the model. The information is stored with the model data (e.g., in the form of an annotation applied to a model feature corresponding to the part in question). The model data may be consulted by product lifecycle management (PLM) applications during various phases of the product's lifecycle. Among other possibilities, the information may be used to automatically generate regulatory compliance documentation, to ensure product quality standards are met during a manufacturing process, or to perform postproduction quality monitoring of the product.

20 Claims, 8 Drawing Sheets

PRIOR ART

FIG. 7

PRIOR ART

FIG. 8

CAD-BASED DESIGN CONTROL

RELATED APPLICATIONS

The present application claims priority to U.S. Provisional Application Ser. No. 62/344,426, filed on Jun. 2, 2016 and entitled "CAD-Based Design Control for Medical Devices." The contents of the aforementioned application are incorporated herein by reference.

BACKGROUND

Three-dimensional modeling may be used to design, model, test, and/or visualize a product. In creating a three-dimensional model-based design, the designed product is defined in the context of three dimensions (e.g., height, width, and depth). The result is a digital prototype of the product, which can be visualized and/or tested in detail in a digital environment without the need to create a physical prototype. One example of a software suite for three-dimensional modeling is the Creo suite of products from PTC of Needham Mass., although one of ordinary skill in the art will recognize that numerous other three-dimensional modeling applications may be employed in connection with exemplary embodiments described herein.

Three-dimensional models may be feature-based models, in which models are built using one or more features. A feature may be defined by a geometry, and may be defined with respect to two-dimensional space, three-dimensional space, or both. Features may be combined, stretched, extruded, or otherwise manipulated to achieve a shape or series of shapes as desired by a user. Examples of feature-based modeling environments include computer-aided design (CAD) and computer-aided manufacturing (CAM) environments.

Designers usually take one of two approaches to 3D design and solid modeling: direct or parametric modeling. Direct modeling provides users with the capability to push and pull directly on geometry. Direct modeling is typically used for quickly developing an initial model and making simple changes to the model. In parametric modeling, the modeling environment maintains consistent relationships between components, so a change to one component may result in a change to other components.

Once constructed, a simulation may be performed on a model. Simulation is the virtual, mathematical process by which a computer processes input data intended to represent certain real world conditions. Stresses and loads under which the modeled product will operate may be defined and the simulation may be carried out based on these parameters. Using the simulation results, design flaws may be fixed or forestalled.

Models may also be utilized in Computer-Aided Manufacturing (CAM), in which computers guide product design and manufacturing; for instance, manufacturing may be performed by a computer numerically controlled (CNC) machine guided by a plan from a three dimensional model. In one example, CAM may be used to design and/or produce molds for molded parts. Once the mold is designed and used to produce a part, CAM processes may be used to machine the part efficiently and precisely.

After a part is designed and manufactured, it may be necessary or useful to track the lifecycle of the product (e.g.) to identify problems with the product and/or to facilitate repairs, upgrades, recalls, etc. Product Lifecycle Management (PLM) provides techniques for managing complex-cross-functional processes and for coordinating the efforts of distributed teams to consistently and efficiently deploy well-functioning products. PLM software may mange different aspects of the product development lifecycle, from conception through service and retirement. An example of a PLM software suite includes the Windchill suite from PTC of Needham, Mass., although one of ordinary skill in the art will recognize that numerous other PLM applications may be employed in connection with exemplary embodiments described herein.

SUMMARY

Exemplary embodiments relate to methods, mediums, and systems for associating information, including critical-to-quality (CTQ) information, with one or more parts in a three-dimensional model. The associated information is stored with the model data and follows the model throughout the product lifecycle (e.g., through various aspects of a PLM cycle).

Exemplary embodiments provide modeling logic configured to access a three-dimensional model of a product. The three-dimensional model may include a feature representing a part of the product. Model data associated with the model, including a data structure representing the feature, may be stored in a non-transitory storage medium accessible to the modeling logic.

Quality control logic may receive an instruction to associate a quality characteristic with the feature. The quality characteristic may be, for example, a minimum or maximum value for a dimension of the feature, or a range of acceptable values for a dimension of the feature, among other possibilities. The instruction may be received from a user via an input device, or may be received programmatically. For instance, the instruction may be received from failure logic configured to identify the quality characteristic by performing a failure mode effect analysis (FMEA) against the model.

The quality control logic may, in response to receiving the instruction, store the quality characteristic in the data structure representing the feature in the model data. Storing the quality characteristic may include storing the information in an annotation associated with the feature.

Product lifecycle management logic may apply the quality characteristic through at least one post-design phase of a product lifecycle management process. For example, during a manufacturing phase, the quality characteristic may be applied by exporting the quality characteristic to a manufacturer system configured to manufacture the product based on the model. During a compliance phase, the quality characteristic may be used to automatically generate a regulatory compliance document based on the quality characteristic. During a post-production monitoring phase, reports of noncompliance may be monitored, associated with the quality characteristic, and may take post-production action based on the reports. Such actions may include, for example, adjusting the quality characteristic, associating the noncompliance with an entity responsible for designing the feature, or generating documentation of the noncompliance and transmitting the generated documentation to an organizational entity responsible for quality control of the product.

According to further embodiments, which may be used separately or in conjunction with the embodiments described above, postproduction monitoring may be performed on the product with respect to the quality information.

According to further embodiments, which may be used separately or in conjunction with the embodiments described above, the quality information may be distributed to relevant parties within an organization in order to improve the culture of quality within the organization.

These and other embodiments are described in more detail below with reference to the attached drawings.

DETAILED DESCRIPTION OF THE PREFERRED EMBODIMENTS

When a product is designed in a three-dimensional model, certain parameters associated with the product may be identified as especially important parameters (e.g., parameters which must take certain values to prevent the product from failing in some way or otherwise becoming defective).

For example, a product may include a feature which must be of a certain minimum thickness to ensure that the stresses expected to be placed on the feature do not cause the feature to fail. When the product is manufactured, the manufacturing process may be associated with various tolerances (e.g., a machine may be able to tool the product to within a few fractions of an inch); it may be important to ensure that the feature meets the minimum thickness requirement given the tolerances that the manufacturing process can achieve. In another example, it may be important to have a record of the minimum thickness in the event that the product is redesigned in the future.

Tracking quality information may be important during other phases of the product lifecycle (e.g., during post-production phases of the lifecycle) as well. For example, regulatory agencies may require certain documentation of product features, and a designer may wish to identify product quality metrics that show compliance with regulatory product standards. Furthermore, if a product is identified as non-conforming or defective after it is released (e.g., it is the subject of a customer complaint), it may be helpful to identify whether any quality metrics are associated with the part that failed in order to determine if the failure was due to a design flaw, a systemic manufacturing error, or was an isolated incident. In the case of a design flaw, it may also be helpful to know which individuals or groups were responsible for quality control for the part in question, so that responsibility for design problems (and design successes) can be appropriately assigned.

Conventional product lifecycle management (PLM) solutions do not provide efficient techniques for accessing quality information throughout the product lifecycle processes. Sometime, design issues may be identified during initial product testing; however, without suitable tools in a PLM system, the design issue may not be properly addressed at various stages of the product lifecycle. For example, if an engineer identifies a minimum thickness required for a particular part, it may be incumbent on that engineer to communicate this information to the appropriate inter-organizational entities responsible for product quality (and, from there, to the extra-organizational parties, such as manufacturers, who may need the information to properly produce or service the product). Conventionally, this may be done using ad hoc notes or memos, which may be lost or forgotten during manufacturing. Moreover, this information may not be documented within the organization, making it harder to track failure modes when reports of noncompliance are received. Still further, future engineers working on new versions of the product may not think to consult this information (or may not be aware that it exists), which means that future product designers may waste unnecessary effort retesting parts in the new version to identify design tolerances.

Oftentimes, design issues may only be identified after the product is released to the market. In these situations, it may be difficult to trace the source of the defect and to correct the defect in future designs without appropriate PLM integration of quality information.

To address these and other issues, exemplary embodiments provide for end-to-end traceability of quality information associated with a product throughout the product's lifecycle. The quality information is integrated into the product's three-dimensional model during the product design phase, and carried through to other phases of the lifecycle (including production and post-production phases). Throughout the lifecycle, the quality information remains accessible and may be automatically leveraged to, among other things, implement compliance and other forms of documentation, guide manufacturing processes, address customer complaints and nonconforming products, etc.

The above-described issues are prevalent in a wide variety of fields. However, they are particularly relevant to medical device design, where high product quality is especially important and regulation is strongly enforced. Accordingly, some embodiments described below are described in connection with the design of medical devices. Nonetheless, the present invention is not so limited, and may be applied to the design of many different types of products.

The present invention will now be described with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Figure 1:
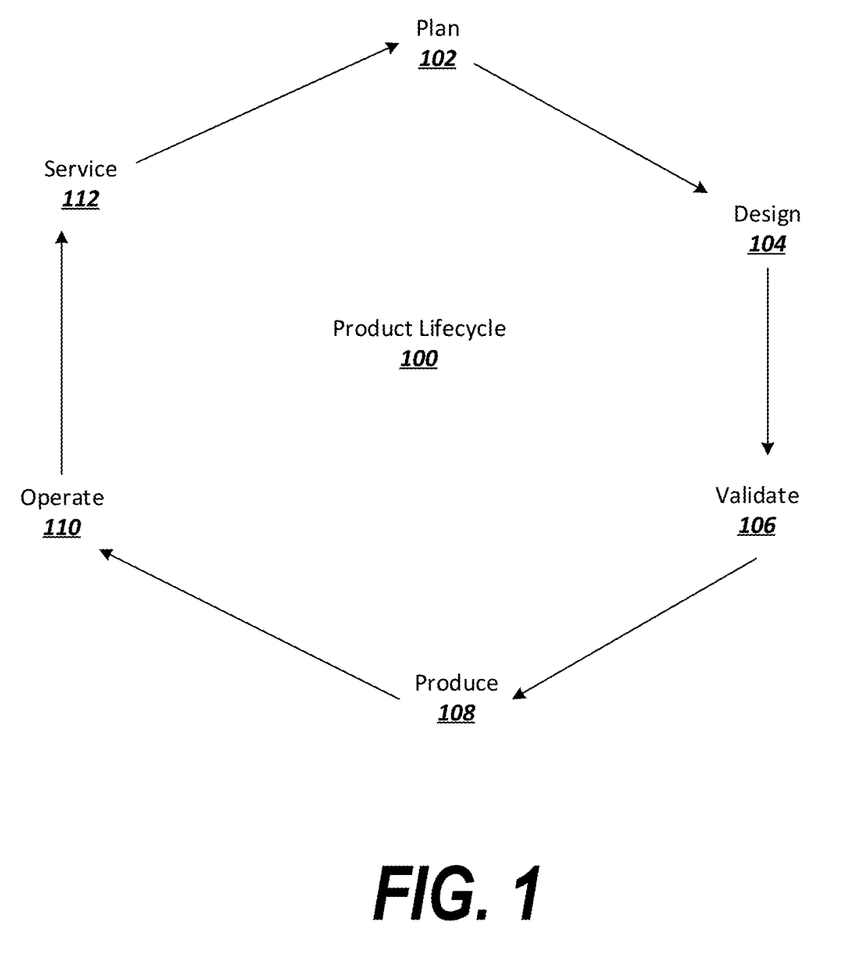
FIG. 1 is a diagram of an exemplary product lifecycle.

FIG. 1 is a diagram of an exemplary product lifecycle 100. The product lifecycle 100 is exemplary and intended to provide a general overview of product lifecycles. In some cases, steps may be repeated and/or performed out-of-order.

During a planning phase 102 (sometimes referred to as a conception phase, product stakeholders have be interviewed or consulted and product requirements may be identified. In some cases, product requirements may be dictated by one or more standards, such as Institute of Electrical and Electronics Engineers (IEEE) standards, International Standards Organization (ISO) standards, American Society of Mechanical Engineers (ASME) codes or standards, etc.

Also during the planning phase 102, a product specification may be generated and documented. Concept design work may be performed. The product may be sketched using pen and paper or computer sketching software (e.g., computer-aided industrial design, or "CAID," software), and rough physical models (e.g., clay models) may be developed. Technologies for the product may be researched and developed.

After the planning phase 102, the product lifecycle 100 may move into a design phase 104. During the design phase 104, the product is realized as a comprehensive design. For example, the product may be realized as a two-dimensional or three-dimensional model in Computer Aided Drafting (CAD) software.

During a validation phase 106, the designed product may be tested. The testing process may involve stress tests of physical prototypes, or may involve simulations of CAD models, among other possibilities. In some cases, early versions of the product may be released on a limited basis, such as to engineers working on the product or to a small group of public testers. The product may be evaluated in view of the requirements identified during the planning phase. The product design may be altered as a result of testing in the validation phase 106.

During a production phase 108 (sometimes referred to as a realization phase), the product may be physically produced. The CAD design created in the design phase 104 may be used to produce computer numerically controlled (CNC) machine instructions for creating tool paths to produce the product. Computer Aided Manufacturing (CAM) software may implement the CNC instructions in view of the CAD design to guide machinery to produce the product. Computer Aided Production Engineering (CAPE) and/or Computer Aided Production Planning (CAPP) tools may create a plant layout, select tools for use in the plant, and/or may perform simulations of a production line. The product may be manufactured in the plant according to the CAD design and may be checked against the CAD design using computer aided inspection equipment. The CAD design and/or information derived from the CAD design (e.g., a parts list, part geometry, etc.) may be provided to sales and/or marketing entities, which may market and/or deliver the product to customers.

Once delivered, the customers may utilize the product in an operation phase 110. During the operation phase 110, the product may perform as expected. However, in some instances, the product may fail to conform to expectations. The product may break or fail due to design flaws, manufacturing defects, operating conditions, or for other reasons.

Accordingly, when a product is identified as non-conforming, the product may be serviced in a service phase 112. The service phase 112 may involve making repairs to the product and/or upgrading the product. Returns, repairs, and upgrades may be logged in a quality management system, such as a Maintenance, Repair, and Operations Management (MRO) application, for tracking.

Eventually, the product design may be retired. In some cases, based on lessons learned throughout the product lifecycle 100, the product may be redesigned. Accordingly, the product lifecycle 100 may return to the planning phase 102, in which the pros and cons of the original design are reviewed and new design considerations are identified. The phases may then repeat.

As can be seen from the above description, there are a variety of opportunities to leverage equality information (such as CTQ parameters) incorporated into a model design. For example:

During tool selection, an appropriate tool that is capable of tooling a product within a required tolerance range may be selected.

During inspection, minimum and maximum threshold values may be enforced by the inspection station.

During the service phase 112, nonconforming parts may be determined and the entities responsible for quality control on those parts may be identified based on the CAD data. This provides an objective quality measurement which can be used during performance reviews. Similarly, parts which experience a relatively low rate of nonconformances may be flagged as particularly well-designed, which may be used to identify top performing engineers and/or quality control staff.

If the product is redesigned or upgraded, quality information from the original product may or may not remain valid. The previous quality information may be considered and re-used or altered.

Throughout the various phases, communication is required between various entities responsible for different aspects of the product lifecycle 100. Integrating quality information derived from the model into communications in a standardized way may prevent confusion and facilitate understanding and discussion.

Figure 2:
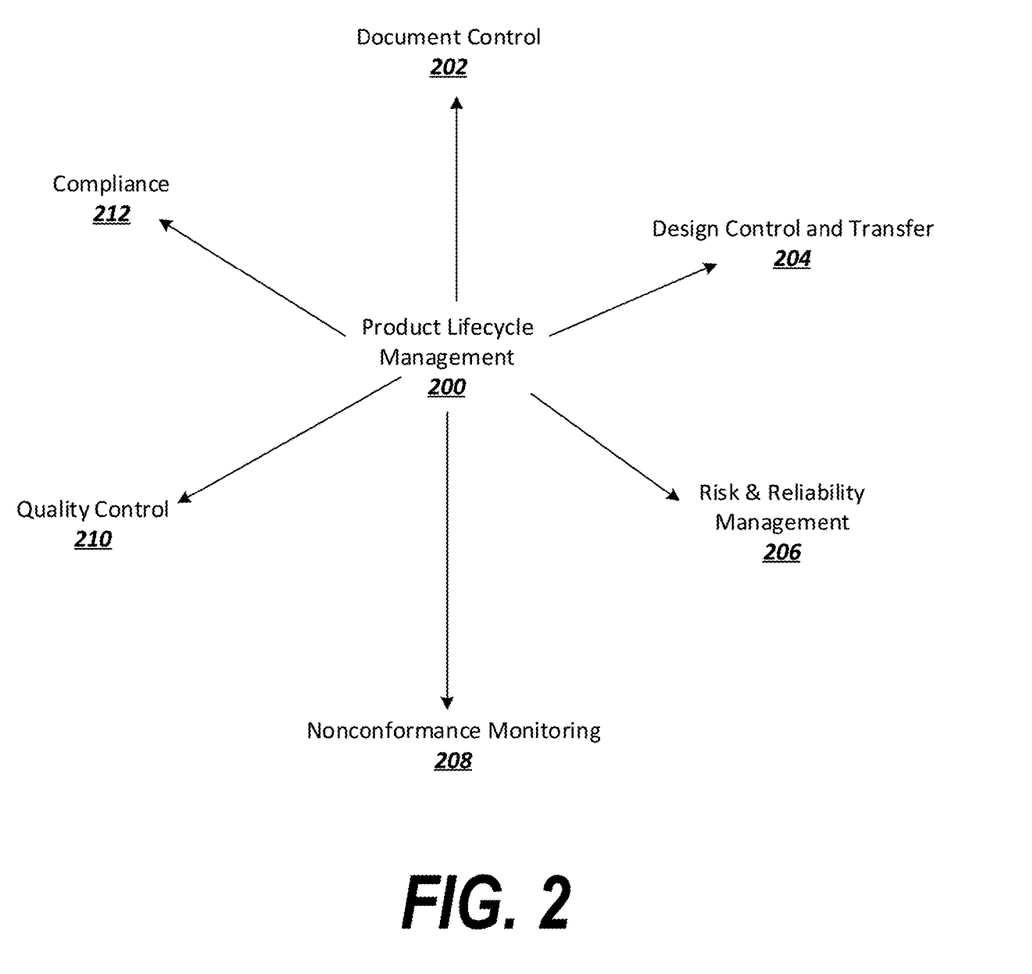
FIG. 2 depicts application interactions for managing a product life cycle.

To this end, quality information may be identified and stored with the model data. The resulting information may be retrieved and used by a product lifecycle management (PLM) system that organizes and manages the various phases of the product lifecycle. An example of processes performed in a PLM system 200 is depicted in FIG. 2.

Depending on the particular field of endeavor, standards may exist relating to required or recommended procedures to be employed by a PLM system 200. For example, ISO 9001 describes general requirements for a quality management system. Depending on the particular type of product, more specific standards may exist; for example, AS9100 applies to the aerospace industry, ISO 13485 applies to the medical device industry, etc. According to exemplary embodiments a PLM system 200 may implement the standards described in ISO 9001, and/or any further application-specific standards.

To this end, various capabilities may be implemented in a PLM system to provide ISO 9001 and/or other standards-based compliance. The PLM system 200 may, for example, incorporate document control procedures 202. The document control procedures 202 may include various rules, templates, etc. for generating Standard Operating Procedures (SOPs), policies, procedures, quality documentation, and regulatory documentation, among other possibilities. In generating these documents, the document control procedures 202 may access a three-dimensional model, retrieve quality information associated with the model, and incorporate the quality information into the documents. Among other possibilities, quality information may be integrated into SOPs, which may be structured documents that can link to related quality documents including quality records. SOPs may be integrated with a product definition and may include a team list indicating who is responsible for SOP execution. Standardized attributes may be integrated into documents managed by the document control procedures 202 to allow for queries and dashboard reports; the attributes may be linked to quality information as appropriate. Documents may be classified and typed or sub-typed to facilitate lifecycle and workflow management.

The document control procedures 202 may centralize both product data and the documentation that specifies organization-wide quality processes—e.g., demonstrating that quality procedures were followed as prescribed. The document control procedures 202 may further provide capabilities to set document attributes and locations, upload the documents, manage and distribute the documents, publish the documents, and view, review, mark up, and/or collaborate on the documents.

The PLM system 200 may further implement design control and transfer procedures 204. Such procedures may assist users in managing a complete product definition by connecting engineering design to manufacture, by providing traceability and change control, by enabling design history files (DHFs) and device master records (DMRs), etc. For example, design control and transfer procedures 204 may be invoked when providing a design to a manufacturer to generate CNC instructions, CAM instructions, etc. The design control and transfer procedures 204 may access quality information from the model and highlight or flag the quality information to the manufacturer to ensure that quality standards identified in the preproduction phases of the product lifecycle are met.

The PLM system 200 may further implement risk and reliability management procedures 206. Such procedures may identify potential quality, reliability, and safety issues as early as possible during product design and development: before much of the product has been finalized and while engineering changes are relatively low-cost. The risk and reliability management procedures may integrate predictive reliability and risk methods with a product's bill of materials and engineering change processes central to PLM in order to drive out product quality issues sooner. A synchronized engineering bill of materials and the ability to drive engineering change in PLM from quality analyses ensures both data and process integration, along with visibility and accountability, between engineering and quality teams.

Among other capabilities, the risk and reliability management procedures 206 may provide reliability and maintainability prediction processes that predict the potential reliability of products early in the design phase, and boost product performance by improving design and maintainability choices. This may include capabilities to predict service needs, processes, parts, personnel, and costs.

The risk and reliability management procedures 206 may further provide safety and risk management processes, such as Failure Modes and Effects Analysis (FMEA) and Fault Tree Analysis (FTA). These tools provide capabilities for evaluating and preventing product quality issues and failures during the design phase, before they emerge in finished products.

The risk and reliability management procedures 206 may further provide test and field reliability processes that may analyze how products performed during testing and in the field. These procedures may provide for the intake, analysis, and reporting of real-world reliability, safety, and quality metrics gathered from test or field.

The risk and reliability management procedures 206 may further provide advanced statistical method such as Reliability Block Diagram, Markov, Weibull and Accelerated Life Testing, etc.

The PLM system 200 may further implement nonconformance monitoring procedures 208. Such procedures may allow the system to capture and manage internal and external quality issues, including manufacturing and supplier nonconformances, customer complaints, etc. The nonconformance monitoring procedures may capture and resolve internal or third-party manufacturing issues centrally, providing roll-up reporting for visibility across many potential sources for quality nonconformances and coordinate root cause investigation with PLM changes for faster, more accurate, and more complete Corrective and Preventive Action (CAPA) processes (CAPAs; see "quality control" procedures below).

The nonconformance monitoring procedures 208 may also implement customer complaints management that provides for the intake and tracking of customer complaints to ensure that external sources for quality issues are accurately managed for full-scale correction/prevention.

The PLM system 200 may further implement quality control procedures 210. The quality control procedures 210 may include procedures for generating and centralizing CAPA processes. CAPAs provide for the investigation, root cause analysis, corrective/preventive actions, and close-out of quality issues from across the product lifecycle. CAPA processes leverage lessons learned from these analyses to improve designs. CAPAs further provide visibility between product data and its associated quality information.

The PLM system 200 may further implement compliance procedures 212. The compliance procedures 212 may include logic for performing audits, ensuring unique device identification (UDI), preparing eSubmissions, etc. Compliance procedures 212 may be implemented to track compliance with any of a wide variety of regulations, customer requirements, supply chain concerns, etc. Examples of compliance concerns include, but are not limited to, compliance with conflict minerals rules, trade rules, battery and packaging directives, waste electrical and electronic equipment (WEEE) directives, Registration, Evaluation, Authorization and Restriction of Chemicals (REACH) regulations, etc. Compliance procedures 212 provide capabilities for, and simplify, performing due diligence and reporting.

Figure 3:
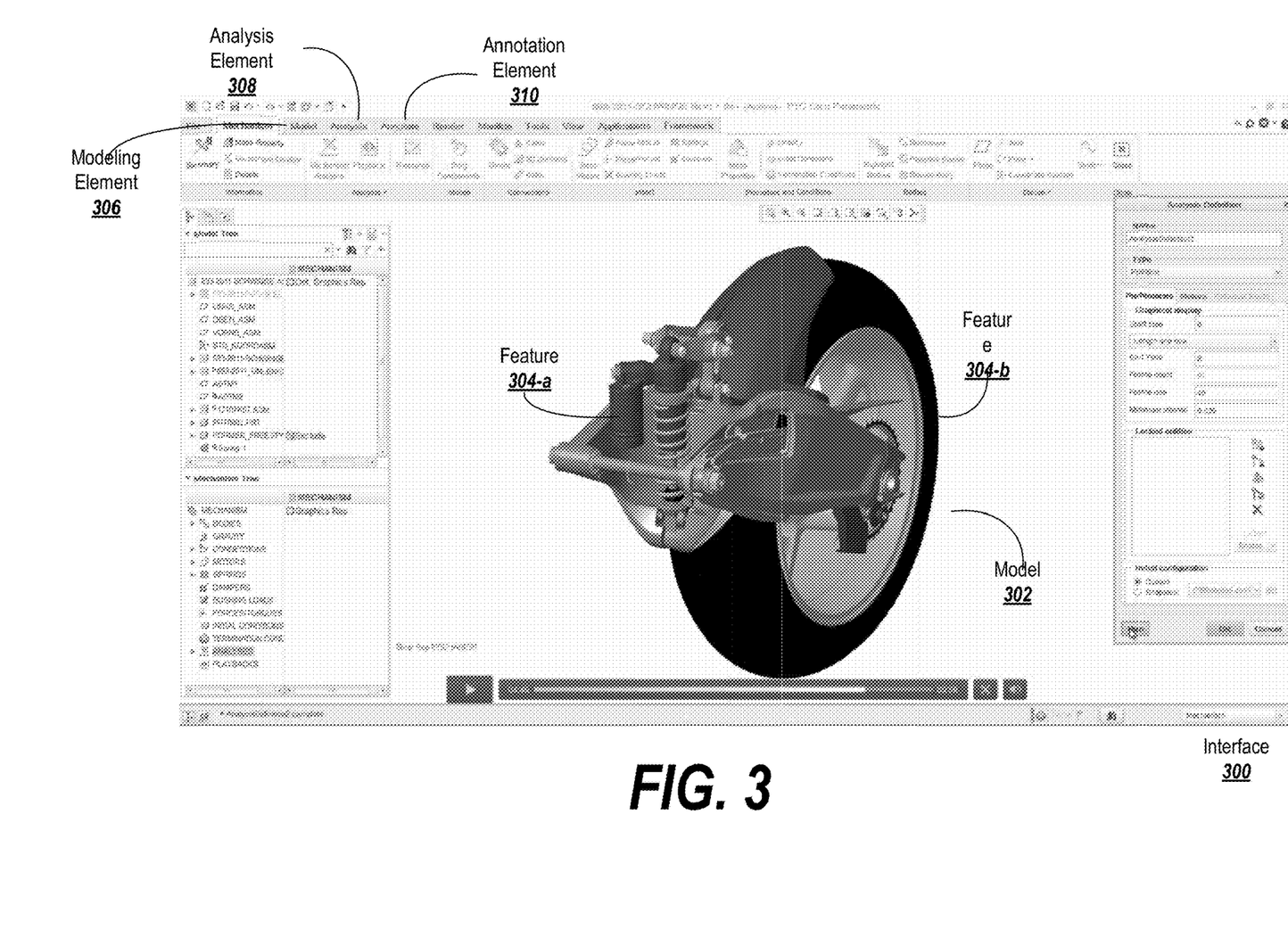
FIG. 3 depicts an exemplary interface for associating a critical-to-quality (CTQ) metric with a model.

Quality information may be retrieved from a model and used in any or all of the above-described product lifecycle management procedures. In order to leverage such quality information, it must first be added to the model. FIG. 3 depicts an exemplary interface 300 for associating a quality metric with a model.

The interface 300 may include a display of a model 302, such as a three-dimensional model. The model 302 may be made up of one or more features 304-a, 304-b. In this example, the model 302 includes a piston feature 304-a and a tire feature 304-b, among others.

The features 304-i may be edited in a modeling interface accessible through a modeling element 306. The interface may also support other types of interfaces, such as an analysis interface accessible through an analysis element 308. The analysis interface may allow a user to specify various simulation parameters and to conduct a simulation under those parameters. The simulation may involve performing mathematical operations on the model 302 in order to approximate real-world conditions of operation for the product being modeled. In some cases, the simulation may exceed certain tolerances for the model as a whole or for individual features of the model, which may cause the model or features to fail (e.g., to break).

Figure 4:
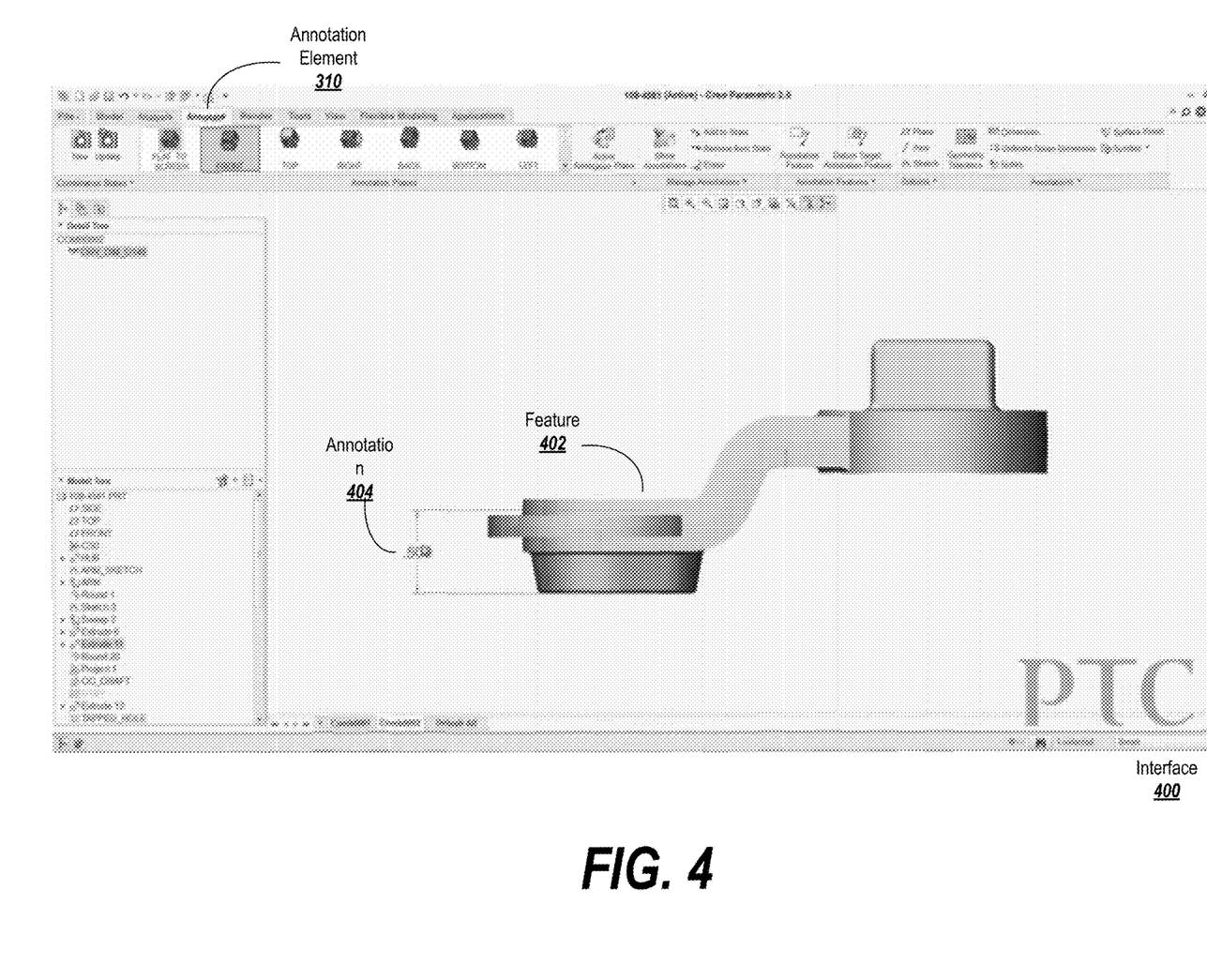
FIG. 4 depicts an example of a 3D annotation applied to a feature in a model.

The simulation may be carried out to identify weak points or critical part dimensions for features of the model (see the discussion of annotations below with respect to FIG. 4). Information derived from the simulation may be stored as annotations on the relevant feature. For example, if it is determined that a feature fails in the simulation when a particular dimension of the feature is below a certain threshold, that threshold value may be stored as quality information in an annotation on the feature in question. Similarly, the feature may be associated with a maximum size threshold (e.g., because the feature requires a certain amount of clearance in relation to other features), or may be associated with a range of acceptable values.

The quality information may include information associated with parameters other than feature dimensions. For example, the quality information may specify a required level of flexibility, hardness, compliance, compressibility, heat or cold tolerance, reflectivity or opacity, electrical resistance, insulation characteristics, and/or other characteristics of the feature.

According to some embodiments, a failure mode and effect analysis (FMEA) may be performed in the analysis interface, the result of which may be the identification of one or more failure modes. The failure modes may be programmatically analyzed or may be examined by an engineer to identify quality parameters that can prevent the failure mode from occurring (or to reduce the risk of the failure mode to an acceptable level, given other constraints such as cost, etc.). The quality parameters may then be associated with a feature as described above.

In some embodiments, the quality information may be identified by an external process and/or by a user, and added to the model as an annotation in an annotation interface. The annotation interface may be accessible via an annotation element 310. The annotation interface may allow information, such as quality information, to be added to the model. For instance, FIG. 4 depicts an example of an annotation 404 applied to a feature 402 in an annotation interface 400.

The annotation 404 may include any relevant data, such as text, images, audio recordings, etc. The annotation 404 may, in some embodiments, include structured data, such as a parameter name (e.g., "height") and a value for the parameter (e.g., "0.500") or a range of values for the parameter (e.g., "0.400-0.600"). The annotation 404 may include units for the parameter (e.g., meters, inches, etc.), or the units may default to a set of units used in the model. In some cases, the annotation 404 may include a descriptor placing constraints on the parameter (e.g., "minimum," "maximum," ">," "<," etc.).

According to some embodiments, the annotation 404 may be a three-dimensional annotation, such that when the annotation 404 is viewed with the feature 402, the annotation 404 may move in three-dimensional space as the feature 402 is moved. The annotation 404 may be movable in the interface (e.g., through user action via an input device) to define the position of the annotation 404 relative to the feature 402.

Figure 5:
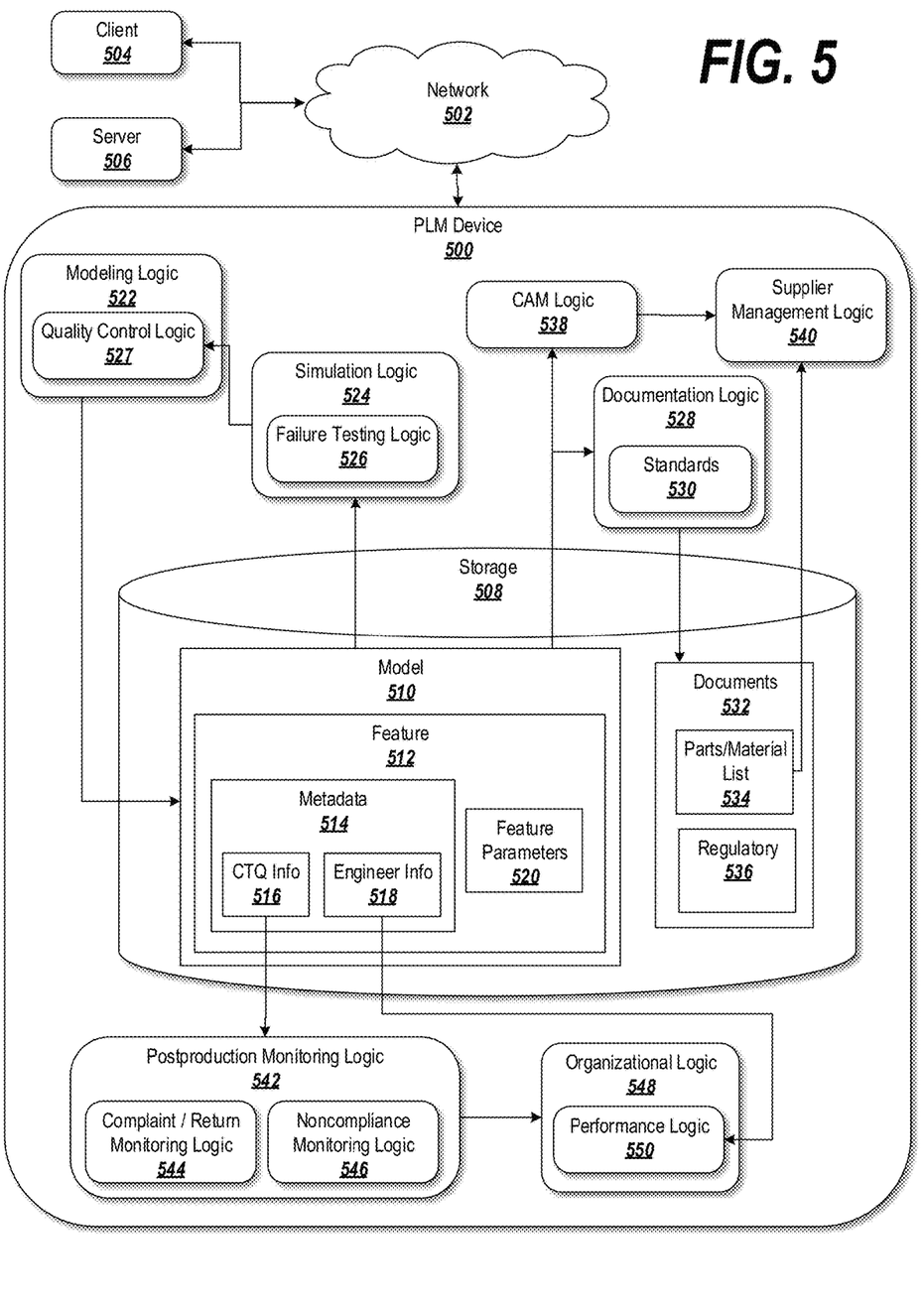
FIG. 5 depicts an exemplary system including logic suitable for use with exemplary embodiments.

Whether automatically or manually added to the feature, the quality information may be associated with a flag or identifier indicating that the data represents quality information. Accordingly, the quality information can be readily identified in the model and retrieved during various phases of the product lifecycle. For instance, FIG. 5 depicts an exemplary system including logic and data structures suitable for use with exemplary embodiments.

The system may include a PLM device 500 for implementing various aspects of product lifecycle management. The PLM device 500 may include various components (as described, e.g., in connection with FIG. 7), as well as various logic and/or storage items, as described below. The logic described below may include instructions capable of being executed by one or more processors to perform the techniques described herein.

The PLM device 500 may communicate via a network 502 (e.g., the Internet, a proprietary network, etc.) with one or more clients 504 and/or servers 506. In some cases, the PLM device 500 may be a client operated by a user; for example, a client device may implement various PLM logic via a PLM application installed on the client device. In others, the PLM device 500 may be a server accessible to a client device; for example, the PLM device 500 may be a server providing PLM capabilities to client devices under a software-as-a-service (SAAS) framework. Furthermore, some or all of the capabilities described below may be split between various devices (e.g., a device associated with a product designer and a device associated with a product supplier).

The PLM device 500 may include a storage 508, which may be a non-transitory computer readable storage medium such as a hard drive or solid state drive. The storage may store data representing a model 510, which may be a two-dimensional or three-dimensional model, such as a CAD model. The model 510 may be made up of one or more features 512, and data for the features 512 may be stored as part of the data for the model 510. Alternatively or in addition, some or all of the data for a given feature 512 may be stored outside the context of the model and associated with the model, as when the feature 512 is provided as part of a template or library.

The data for the feature 512 may include metadata 514 and feature parameters 520. The feature parameters may define the location, position, etc. of the feature 512 with respect to the space in which the model 510 exists and/or with respect to other features of the model.

The metadata 514 for the feature may include non-parameter information about the feature 512. For example, the feature may include quality information such as CTQ information 516. The CTQ information 516 may be stored as an annotation associated with the feature 512. It may be stored in the metadata 514 for the feature 512, or may be stored remotely from the feature metadata 514 and associated with the feature 512 (e.g., through a pointer). The metadata 514 may further include engineer or responsible party information 518, indicating an identity of an engineer responsible for designing the feature and/or a quality control entity responsible for overseeing the quality of the product/feature.

The model may be constructed through modeling logic 522 that allows the model 510 to be built and/or modified in a modeling interface. For example, the modeling logic 522 may provide a CAD application for creating the model 510. The data for the model 510 may be edited by the modeling logic 522.

The modeling logic 522 may include quality control logic 527 configured to associate quality information (e.g., the CTQ information 516) with the model. The quality control logic 527 may be configured to receive the quality information through an annotation interface. The annotation interface may allow the user to add an annotation to a feature of the model, and may provide an option to flag the thus-annotated information as quality information to be carried through to further phases of the product lifecycle process.

The PLM device 500 may further include simulation logic 524 for carrying out a simulation of the model 510. The simulation logic 524 may include failure testing logic 526, such as logic for implementing FMEA, as described above. The simulation logic 524 may read the data for the model 510 and may perform mathematical calculations/transformations to evaluate the performance of the model in simulated real-world conditions (or exaggerated conditions).

The simulation logic 524 may identify one or more failure modes and/or other feature parameters that may cause the product to fail. The simulation logic 524 may present this information to a user, who may add quality information to the model based on the simulation results through the quality control logic 527. Alternatively or in addition, the quality control logic 527 may receive the quality information directly from the simulation logic 524.

The PLM device 500 may further include documentation logic 528 for creating, modifying, storing, and managing one or more documents 532 associated with the model 510. The documentation logic may generate the documents in accordance with one or more templates and/or standards 530. The standards 530 may also or alternately be applied in conjunction with other logic, such as the postproduction monitoring logic 542 described below.

The documents 532 may include, for example, parts and materials lists 534 generated from the model 510 by the documentation logic. The documents 532 may also include regulatory documents 536 automatically generated by, or created with the assistance of, the documentation logic 528.

The PLM device 500 may further include CAM logic 538 and/or supplier management logic 540. The CAM logic 538 may manage various aspects of device fabrication, while the supplier management logic may facilitate the transfer of information (e.g., the parts/material list 534) to outside manufacturers. The CAM logic 538 and/or supplier management logic 540 may access the quality information from the model data 510 and ensure that the quality information is communicated to an outside manufacturer system so that it can be enforced during the manufacturing process.

The PLM device 500 may further include postproduction monitoring logic 542 for managing various aspects of the product life cycle after the product is manufactured. The postproduction monitoring logic 542 may include, for example, complaint/return monitoring logic 544 for registering incoming reports from customers who indicate that the product failed in some way.

The postproduction monitoring logic 542 may further include noncompliance monitoring logic 546 for identifying why and how a product failed. If the failure can be traced to a particular feature, the postproduction monitoring logic 542 may access quality information related to the feature. The postproduction monitoring logic 542 may determine, for example, if the product was manufactured to the specifications described by the quality information. If not, the postproduction monitoring logic may determine that the failure was due to a manufacturing defect. The system may generate any necessary documentation and/or flag the issue for rectification by an entity associated with the manufacturer. Alternatively, if the product was manufactured to the specifications described by the quality information, it may be necessary to adjust the quality information (e.g., perhaps a minimum thickness identified in the quality information was too small such that the product was insufficiently thick and was able to fail under certain conditions). To this end, the system may call on the simulation logic 524, propagating a simulation with the real-world values reported by the complaint/return monitoring logic 544 and determine if the product fails in a relatively significant number of cases (e.g., based on a cost-benefit analysis). If so, the postproduction monitoring logic 542 may adjust the quality parameters to become more conservative in order to prevent future failures.

The PLM device 500 may further include organizational logic 548 for propagating information through an organization responsible for designing the product. For example, noncompliance reports generated by the noncompliance monitoring logic 546 may be automatically generated and transmitted to an organizational entity responsible for quality control over the product or feature in question. The reports may be stored with the documents 532 in the storage 508.

The organizational logic 548 may further include performance logic for tracking engineering quality metrics. The performance logic 548 may identify a number or proportion of product failures due to a given feature, and may retrieve an identity of the engineer or quality control entity responsible for the feature from the information 518 stored with the model 510.

Figure 6:
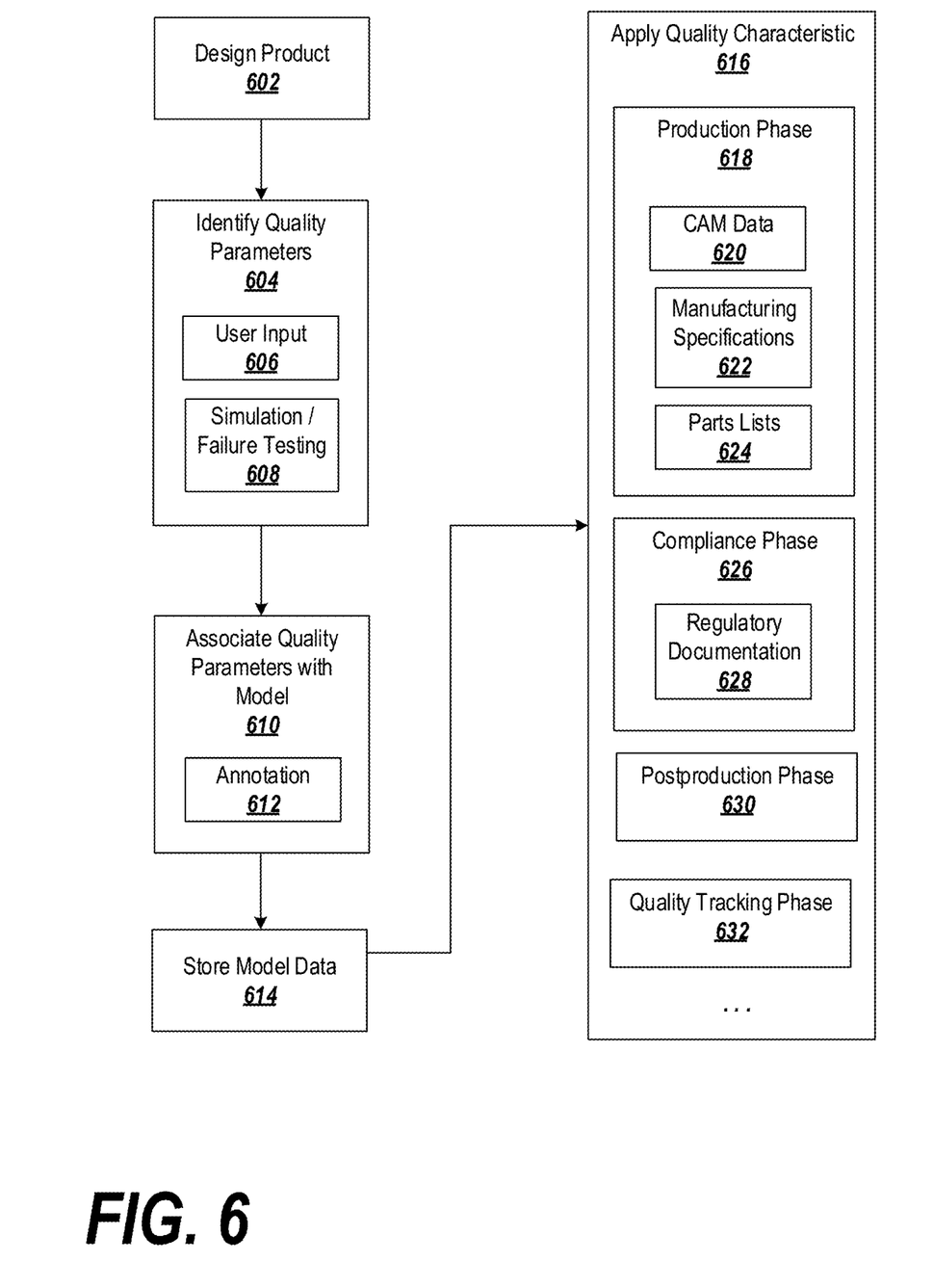
FIG. 6 is a flowchart describing exemplary logic for tracking quality metrics throughout a product lifecycle.

The above-described techniques may be carried out using logic implemented on one or more processors. For instance, FIG. 6 is a flowchart describing exemplary logic for tracking quality metrics throughout a product lifecycle.

At block 602, a product may be designed using modeling logic, such as CAD software. The product may be designed in a model, which may be a two-dimensional model or a three-dimensional model and which may be a feature-based model.

At block 604, the system may identify one or more quality parameters associated with the model and/or a feature of the model. For example, at block 606, the quality parameters may be input by a user (e.g., after reviewing the results of a simulation, based on tests of a prototype or physical model, based on real-world performance data, etc.).

Alternatively or in addition, at block 608 the quality information may be programmatically identified through simulation and/or failure testing (e.g., FMEA). For example, the system may receive a selection of one or more features and/or characteristics of the feature(s) to be tested (e.g., thickness, density, permeability, etc.). The system may calculate one or more threshold values that are predicted to cause the feature to fail. In some embodiments, the system may simulate the model using various values for the characteristics, identifying which values cause the model to fail and which do not. The system may progressively hone in on a maximum or minimum value at which the model does not fail and may store this information as a threshold in the quality information.

As another example, the quality parameters may be identified using machine learning. For example, a number of product designs (for the same or different products) may be provided to machine learning logic, with quality parameters identified. Based on previous examples of quality parameters, the machine learning logic may be configured to identify, in new designs, features for which quality parameters may apply, identify quality parameters, and estimate values for the quality parameters. Estimated quality parameter values may be provided to failure testing logic to determine if the quality parameters are applicable and/or to set or refine the values for the quality parameters.

At block 610, the system may associate the quality parameters with the model. In one example, at block 612 the system may add the quality information to the model through an annotation applied to a feature to which the quality information applies. Within the annotation's data structure, the quality information may be flagged as such. For example, the quality information may be associated with a type that identifies the information as quality information. The quality information may be associated with the model through other means as well, such as external documentation or a designated quality information field assigned to the model (e.g., a table of features and associated with related quality information).

The quality information may, additionally or alternatively, be registered to the feature by adding the quality parameter to a list of quality parameters maintained for the feature. For instance, the quality parameter may be stored as structured data within a data structure for the feature, or a data structure for the model, or separate from the model and the feature.

The structured data may be identified or flagged as quality information as discussed above. A list, such as a table, linked list, database, etc., may be maintained for the feature and may be stored with the feature or separately from the feature. The structured data representing the quality information may be added to (or referenced by) the list. Multiple quality parameters may be represented in the list for a given feature. When quality information is needed for the feature (e.g., when constructing a bill of materials, generating compliance information, providing customer service, etc.), the list may be programmatically queried to retrieve the quality information, which may be propagated to suitable logic, remote systems, etc. for analysis or other uses.

In some embodiments, the quality information may be stored in the list and reflected in the annotation. In this case, for example, it may not be necessary to store the quality information or flag the quality information within the annotation's data structure; for example, the annotation may include a reference or pointer to quality information stored elsewhere, such that when then annotation is rendered, the reference is followed to the structure including the quality information and automatically populated as text or an image in the annotation.

At block 614, the system may store the model data, including the quality parameters identified in block 604, in a storage. At block 616, the quality characteristic may be retrieved from the storage as the product moves through various product lifecycle phases and applied in one or more of the product lifecycle phases. Applying the quality characteristic in one or more product lifecycle phases may involve programmatically retrieving the quality characteristic from the data structure representing the feature, and operating on the quality characteristic with an electronic device configured to perform a post-design phase action with respect to the product.

For example, at block 618, the quality characteristic may be applied in a production phase of the product lifecycle. As previously described, the quality characteristic may be integrated into CAM data (block 620) and used to direct a manufacturing process. Alternatively or in addition, the quality characteristic may be integrated into documentation or manufacturing specifications (block 622), and may be transmitted to a manufacturer. Still further, the quality characteristic may be incorporated into a parts list or bill of materials (block 624), which may be provided to a manufacturer, a sales representative, a marketing entity, etc.

At block 626, the system may apply the quality characteristic in a compliance phase. For example, the quality characteristic may be used to verify that the product complies with one or more regulatory or standards-based requirements, and regulatory documentation may be automatically and/or semi-automatically generated (block 628). In other cases, the quality information may be carried through to other aspects of the compliance phase, such as auditing, UDIs, eSubmissions, etc.

At block 630, the quality characteristic may be applied in a postproduction phase of the product lifecycle, such as an operation or service phase of the product lifecycle. For example, the quality characteristic may be mapped to one or more noncompliance reports, failure reports, return reports, warranty documents, etc. The noncompliance or failure may be automatically reported to one or more entities responsible for quality control of the noncomplying/failed product or feature. The quality information may be adjusted in response to the noncompliance or failure, if appropriate, as described above.

In further embodiments, the quality information may be propagated to a new design based off of the original design generated in block 602. To this end, the system may identify a feature in the new design corresponding to a feature in the original design, and may copy the quality information from the original feature to the new feature.

At block 632, the quality characteristic may be applied during a quality tracking phase, which may be a sub-phase of the postproduction phase. For example, the quality characteristic may be used to assign failures or nonconformances to an entity responsible for the feature in question (e.g., a quality control manager, an engineer, etc.). This information may be applied to quantify a performance review by indicating, e.g., a rate of failure or nonconformance for features designed by a particular engineer as compared to other engineers, a rate of failure or nonconformance for features over which a particular quality control entity has responsibility as compared to other quality control entities, etc.

Computing System and Network Implementation

Figure 7:
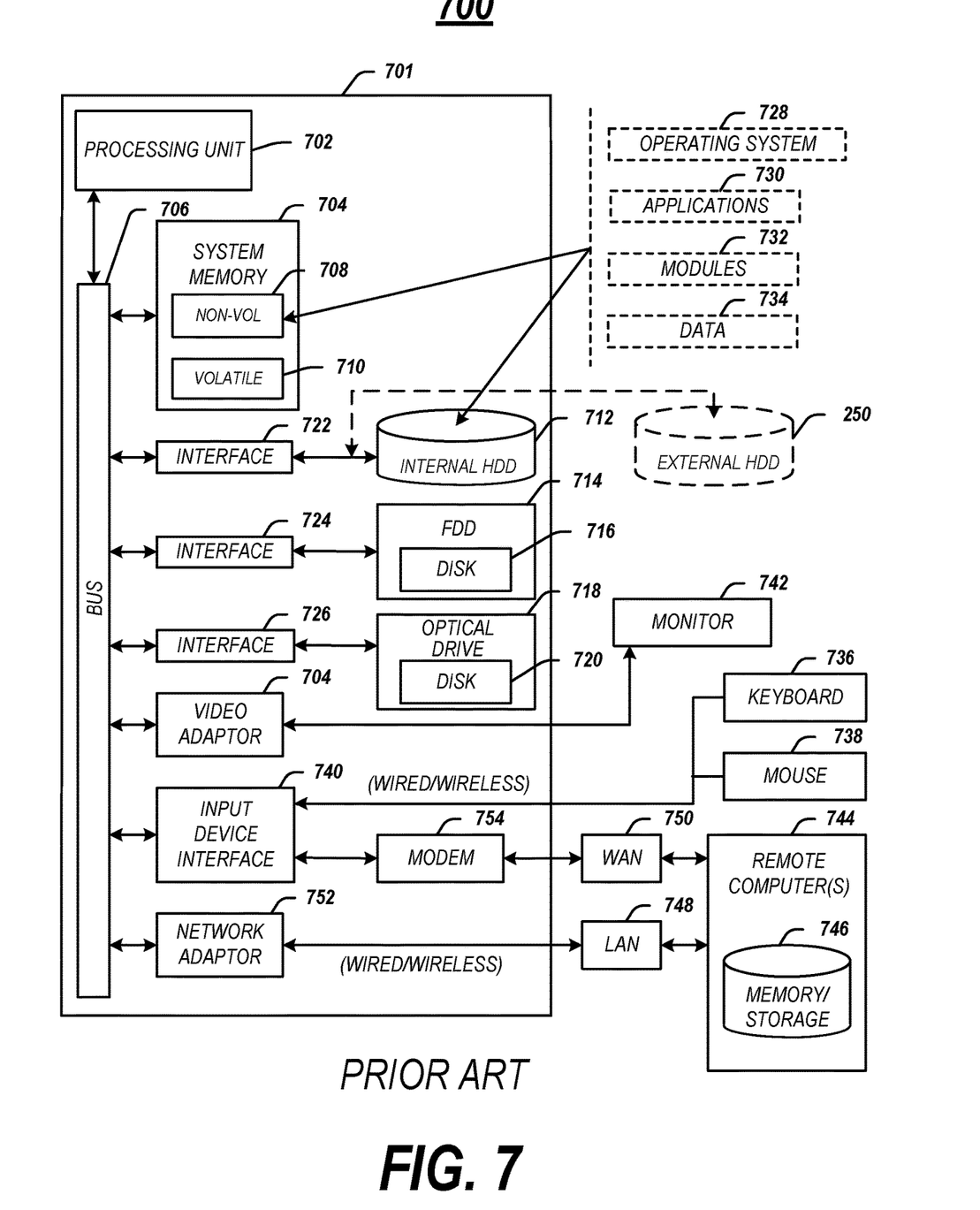
FIG. 7 depicts an electronic device suitable for use in exemplary embodiments.

The above-described methods may be embodied as instructions on a non-transitory computer readable medium (excluding transitory propagating signals) or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
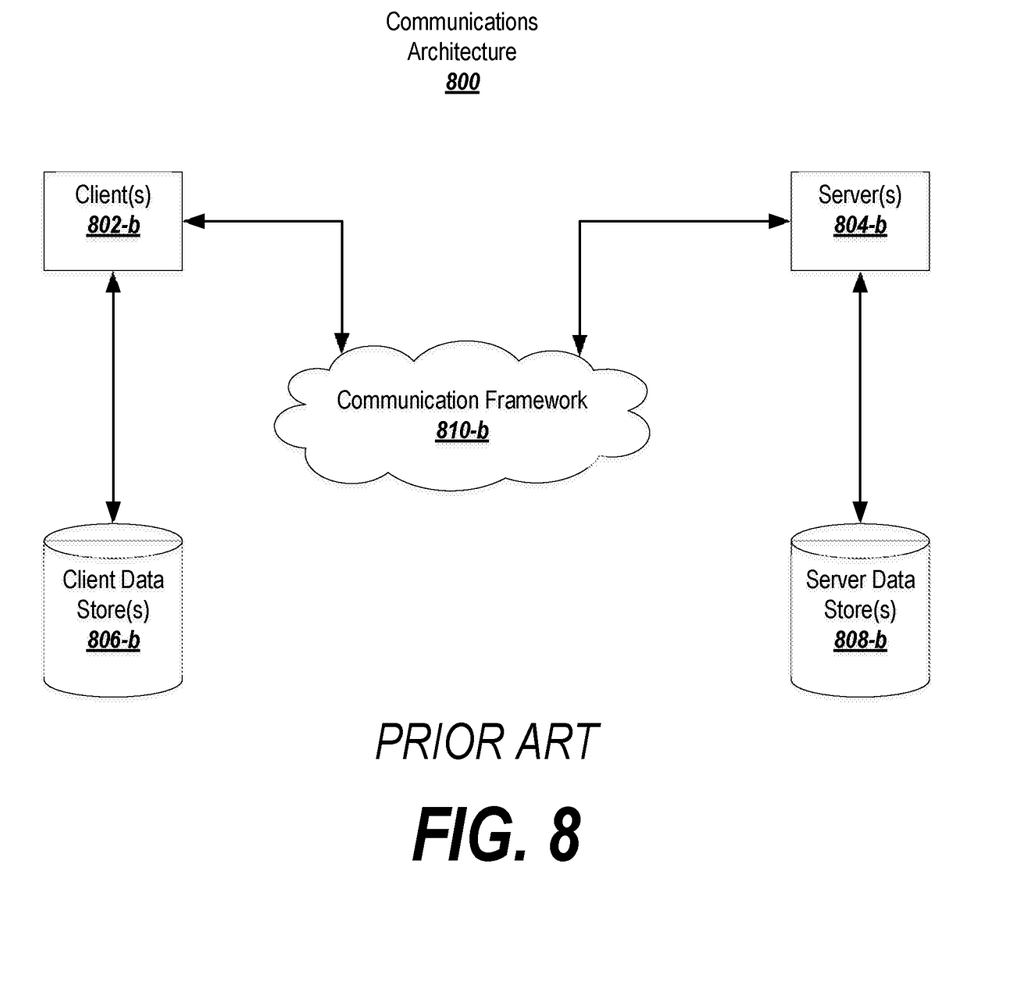
FIG. 8 depicts an exemplary network architecture suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Any or all of the above-described techniques may be implemented by suitable logic stored on a non-transitory computer-readable medium. When executed by one or more processors, the logic may cause the processors to perform the techniques identified above. The logic may be implemented fully or partially in hardware.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   accessing, using modeling logic executing on a processor circuit, a three-dimensional model of a product, the three-dimensional model comprising a feature representing a part of the product, the three-dimensional model associated with model data stored in a non-transitory storage medium, the model data comprising a data structure representing the feature that includes a list of quality characteristics;
   receiving an instruction to associate a quality characteristic with the feature, wherein the quality characteristic comprises one or more of: a minimum value for a parameter of the feature, a maximum value for the parameter of the feature, or a range of values for the parameter of the feature;
   storing the quality characteristic in the data structure representing the feature in the model data, the storing comprising constructing a structured data element holding the quality characteristic and adding the structured data element to the list of quality characteristics in the data structure representing the feature;
   accessing the stored quality characteristic from the data structure representing the feature during a post-design phase of a product lifecycle management process; and
   processing the quality characteristic with an electronic device configured to perform a post-design phase action with respect to the product as part of the post-design phase action.

2. The method of claim 1, further comprising identifying the quality characteristic by performing a failure mode effect analysis (FMEA) against the model.

3. The method of claim 1, wherein the quality characteristic is stored in the data structure during a design phase of the product.

4. The method of claim 1, wherein the post-design phase is a production phase, and processing the quality characteristic comprises exporting the quality characteristic to a manufacturer system configured to manufacture the product based on the model.

5. The method of claim 1, wherein the post-design phase is a compliance phase, and processing the quality characteristic comprises automatically generating a regulatory compliance document based on the quality characteristic.

6. The method of claim 1, wherein the post-design phase is a postproduction monitoring phase, and processing the quality characteristic comprises:
   receiving a report of a nonconformance relating to the product;
   determining that the nonconformance is associated with the quality characteristic of the feature; and
   performing at least one of adjusting the quality characteristic, associating the nonconformance with an entity responsible for designing the feature, or generating documentation of the nonconformance and transmitting the generated documentation to an organizational entity responsible for quality control of the product.

7. The method of claim 1, wherein the data structure representing the feature comprises an annotation applied to the feature on the model.

8. A non-transitory computer-readable medium storing instructions that, when executed, cause one or more processors to:
   access, using modeling logic executing on a processor circuit, a three-dimensional model of a product, the three-dimensional model comprising a feature representing a part of the product, the three-dimensional model associated with model data stored in a non-transitory storage medium, the model data comprising a data structure representing the feature that includes a list of quality characteristics;
   receive an instruction to associate a quality characteristic with the feature wherein the quality characteristic comprises one or more of: a minimum value for a parameter of the feature, a maximum value for the parameter of the feature, or a range of values for the parameter of the feature;
   store the quality characteristic in the data structure representing the feature in the model data, the storing comprising constructing a structured data element holding the quality characteristic and adding the structured data element to the list of quality characteristics in the data structure representing the feature;

access the stored quality characteristic from the data structure representing the feature during a post-design phase of a product lifecycle management process; and processing the quality characteristic with an electronic device configured to perform a post-design phase action with respect to the product as part of the post-design phase action.

9. The medium of claim 8, further storing instructions for identifying the quality characteristic by performing a failure mode effect analysis (FMEA) against the model.

10. The medium of claim 8, wherein the quality characteristic is stored in the data structure during a design phase of the product.

11. The medium of claim 8, wherein the post-design phase is a production phase, and processing the quality characteristic comprises exporting the quality characteristic to a manufacturer system configured to manufacture the product based on the model.

12. The medium of claim 8, wherein the post-design phase is a compliance phase, and processing the quality characteristic comprises automatically generating a regulatory compliance document based on the quality characteristic.

13. The medium of claim 8, wherein the post-design is a postproduction monitoring phase, and processing the quality characteristic comprises:

receiving a report of a nonconformance relating to the product;

determining that the nonconformance is associated with the quality characteristic of the feature; and performing at least one of adjusting the quality characteristic, associating the nonconformance with an entity responsible for designing the feature, or generating documentation of the nonconformance and transmitting the generated documentation to an organizational entity responsible for quality control of the product.

14. The medium of claim 8, wherein the data structure representing the feature comprises an annotation applied to the feature on the model.

15. An apparatus comprising:

a processor circuit;

modeling logic executable on the processor circuit, the modeling logic configured to access a three-dimensional model of a product, the three-dimensional model comprising a feature representing a part of the product, the three-dimensional model associated with model data stored in a non-transitory storage medium, the model data comprising a data structure representing the feature that includes a list of quality characteristics;

a non-transitory storage medium configured to store model data associated with the three-dimensional model, the model data comprising a data structure representing the feature;

quality control logic executable on the processor circuit and configured to receive an instruction to associate a quality characteristic with the feature, wherein the quality characteristic comprises one or more of: a minimum value for a parameter of the feature, a maximum value for the parameter of the feature, or a range of values for the parameter of the feature, and to store the quality characteristic in the data structure representing the feature in the model data, the storing comprising constructing a structured data element holding the quality characteristic and adding the structured data element to the list of quality characteristics in the data structure representing the feature; and product lifecycle management logic executable on the processor circuit and configured to access the stored quality characteristic from the data structure representing the feature during a post-design phase of a product lifecycle management process, and to process the quality characteristic with an electronic device configured to perform a post-design phase action with respect to the product as part of the post-design phase action.

16. The apparatus of claim 15, further comprising failure logic executable on the processor circuit and configured to identify the quality characteristic by performing a failure mode effect analysis (FMEA) against the model.

17. The apparatus of claim 15, wherein the quality characteristic is stored in the data structure during a design phase of the product.

18. The apparatus of claim 15, wherein the post-design phase is a production phase, and processing the quality characteristic comprises exporting the quality characteristic to a manufacturer system configured to manufacture the product based on the model.

19. The apparatus of claim 15, wherein the post-design phase is a compliance phase, and processing the quality characteristic comprises automatically generating a regulatory compliance document based on the quality characteristic.

20. The apparatus of claim 15, wherein the post-design phase is a postproduction monitoring phase, and processing the quality characteristic comprises:

receiving a report of a nonconformance relating to the product;

determining that the nonconformance is associated with the quality characteristic of the feature; and performing at least one of adjusting the quality characteristic, associating the nonconformance with an entity responsible for designing the feature, or generating documentation of the nonconformance and transmitting the generated documentation to an organizational entity responsible for quality control of the product.

* * * * *